Patented Nov. 2, 1948

2,452,535

UNITED STATES PATENT OFFICE 2,452,535

2-AMINO-2-ALKYL-N,N'-DIARYL-1,3 PROPANE DIAMINES AND PROCESS FOR MAKING

Harold G. Johnson, Terre Haute, Ind., assignor to Commercial Solvents Corporation, Terre Haute, Ind., a corporation of Maryland No Drawing. Application January 8, 1945, Serial No. 571,955

8 Claims. (Cl. 260—576)

My invention relates to new and useful polyamines. More particularly, it is concerned with polyamines having the following structural formula:

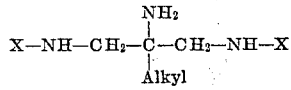

wherein X represents a substituent selected from a class consisting of phenyl, chlorophenyl, aminophenyl and alkylphenyl.

This case is a continuation-in-part of my abandoned application U. S. Serial No. 459,447, filed September 23, 1942.

Polyamines of the above type are readily prepared from the corresponding N,N'-substituted 2-nitro-2-alkyl-1,3-propanediamines by subjecting the latter to catalytic liquid phase high pressure hydrogenation. In accordance with this procedure, the nitro amine, catalyst and a suitable solvent, such as methyl or ethyl alcohol, are introduced into a pressure hydrogenation apparatus of conventional design, such as that of the Adkins type, which comprises a cylindrical steel reaction vessel with a flexible tubing for the introduction of hydrogen under pressure. The apparatus may be equipped with an electrical heating unit, in order that the hydrogenation may be carried out at elevated temperatures, if desired.

The catalyst utilized may be any of several hydrogenation catalysts which are active under the operation temperatures employed. A number of such hydrogenation catalysts are described in Ellis' book on "Hydrogenation of Organic Substances," 3rd ed., (1930). In the majority of instances, however, I have found that the well known Raney nickel catalyst usually gives the most satisfactory results. Numerous other hydrogenation catalysts are, nevertheless, quite satisfactory and will be found to be sufficiently active under the operating conditions employed to result in adequate yields of polyamine which render the use of such catalysts practicable from an economical standpoint. For example, nickel precipitated from nickel carbonate and supported on infusorial earth (Covert et al., J. Amer. Chem. Soc., 54, 1651 (1932)), or catalysts of nickel on silical gel (Holmes and Anderson, Ind. & Eng. Chem., 17, 280 (1925)), may also be employed. These catalysts are most active at temperatures above 80 to 85° C., however, and are less desirable for hydrogenation reactions at lower temperatures. In general, it may be said in regard to the type of hydrogenation catalyst employed, it will be found preferable to utilize catalysts that are active at lower temperatures, due to the tendency of the nitro amines to decompose under conditions of elevated temperature and pressure.

Hydrogen is introduced into the apparatus in a manner such that the pressure exerted thereby will vary from approximately 300 to over 2000 pounds per square inch. In general, however, I prefer to use pressures ranging from between about 500 to 1000 pounds per square inch, but it is to be understood that other hydrogen pressures may be employed, their values generally being determined by the temperature used. The hydrogenation is preferably carried out at temperatures ranging from between about 30 and 50° C., with constant agitation, for a period of from one to four hours. Temperatures of from 100 to 125° C. may be employed, however, provided adequate precautions are exercised with respect to the hydrogen pressure used. Ordinarily, optimum conditions in regard to time of reaction, temperatures, pressure, and catalyst, in any given instance, may readily be determined by simple experiment.

After the reduction is complete, the reaction mixture is removed from the apparatus, and the catalyst separated by filtration or other suitable means. The resulting filtrate is then distilled at atmospheric pressure to remove the solvent, after which a liquid, such as benzene or toluene, is added to the still residue for the purpose of removing the water formed during the reduction of the nitro compound. After all of the water is removed in this manner, the crude polyamine, if a liquid, is purified by rectification at atmospheric pressure or under vacuum, or by recrystallization from a suitable solvent, if it happens to be a solid under ordinary conditions.

The nitro amines employed as starting materials for the preparation of the polyamines of my invention, may be synthesized in accordance with the procedure described in my copending application, U. S. Serial 571,954, filed January 8, 1945, Patent Number 2,447,653. By this procedure, a primary aromatic amine is reacted with a suitable dihydric primary nitro alcohol in the presence of a basic catalyst, such as, for example sodium hydroxide, tributylamine, triethylamine, trimethylbenzylammonium hydroxide, or the like, at a temperature of approximately 50° C., or alternatively by the reaction of a primary aromatic amine, a primary nitroparaffin having more than one carbon atom and formaldehyde. Although it may generally be desirable to reduce the substantially pure nitro amines, I have observed that highly satisfactory and frequently equally as goods results are obtained by subjecting the entire reaction mixture, containing the crude nitro amine, to reduction, in the presence of a suitable catalyst and solvent, as described above.

My invention may be further illustrated by the following specific examples:

*Example I*

One hundred and eighteen parts of 2-nitro-2-methyl-N,N'-diphenyl-1,3-propanediamine was dissolved in 300 parts of methyl alcohol. This solution was then introduced into a hydrogenation apparatus with 15 parts of Raney nickel catalyst. Reduction of the nitro compound was then carried out at a temperature of 50° C., and under a hydrogen pressure of 550 pounds per square inch. Upon completion of the reaction, the solution was removed from the apparatus, filtered and the filtrate distilled at atmospheric pressure in order to remove methyl alcohol. Two hundred parts of benzene was then added to the still residue, and the water produced from the reduction of the nitro group to an amino group was removed as a constant boiling mixture with benzene, the latter being returned to the still until substantially all of the water had been separated from the crude polyamine. The residue was then distilled under reduced pressure. The 2-amino-2-methyl-N,N'-diphenyl-1,3-propanediamine was a pale yellow liquid boiling at 189° C. (1 mm.). This liquid, on standing at room temperature, however, set to a white crystalline solid melting at 52.6° C. A conversion of 81.5 per cent of 2-nitro-2-methyl-N,N'-diphenyl-1,3-propanediamine to 2-amino-2-methyl-N,N'-diphenyl-1,3-propanediamine, was obtained.

*Example II*

Two hundred parts of 2-nitro-2-ethyl-N,N'-diphenyl-1,3-propanediamine was mixed with 600 parts by volume of methanol and 20 parts of Raney nickel catalyst in a pressure vessel. The charge was hydrogenated at 1000 pounds pressure at a temperature between 33 and 45° C. After the reaction was complete, the charge was removed from the vessel, the Raney nickel filtered out and the charge evaporated to remove the methanol. The resulting 2-amino-2-ethyl-N,N'-diphenyl-1,3-propanediamine was a light yellow solid having a boiling point between 204 and 210° C. at 2 mm. pressure, a specific gravity of 1.1088, a refractive index of 1.6125 and a nitrogen content of 14.94% as compared to a theoretical of 15.6% for this product.

*Example III*

One hundred and eight parts by weight of 2-nitro-2-methyl-N,N'-bis(p-chlorophenyl)-1,3-propanediamine were mixed with 200 parts by volume of butanol and 400 parts by volume of methanol and 20 parts of Raney nickel catalyst in a pressure vessel. The charge was hydrogenated at 1000 pounds pressure at a temperature between 37 and 40° C. After completion of hydrogen adsorption, the charge was removed from the pressure vessel, the Raney nickel was filtered off and the mixture was evaporated to remove alcohol. The resulting 2-amino-2-methyl-N,N'-bis(p-chlorophenyl)-1,3-propanediamine was a light yellow liquid boiling at between 165 and 173° C. at 2 mm. pressure; had a refractive index of 1.5580 and a nitrogen content of 12.56 as compared to a theoretical of nitrogen of 12.95 for this product.

*Example IV*

One hundred and eight parts by weight of 2-nitro-2-methyl-N,N'-di-p-tolyl-1,3-propanediamine were mixed with 600 parts by volume of methyl alcohol and 20 parts by weight of Raney nickel catalyst in a pressure vessel. The charge was hydrogenated at a pressure of 1000 pounds per square inch and a temperature between 30 and 44° C. After completion of the hydrogen adsorption the charge was removed from the pressure vessel, filtered to remove Raney nickel, and the alcohol was evaporated. The resulting product was a colorless solid having a melting point of 74°, and a nitrogen content of 14.54% as compared to 14.8% theoretical for this compound.

*Example V*

One hundred and ten parts by weight of 2-nitro-2-methyl-N,N'-bis(p-aminophenyl)-1,3-propanediamine were mixed with 600 parts by volume of methyl alcohol and 20 parts by weight of Raney nickel catalyst in a pressure vessel. The charge was hydrogenated at a pressure of 1000 pounds per square inch at a temperature between 35 and 40° C. After the hydrogenation was complete, the charge was removed from the vessel and the Raney nickel filtered off. The mixture was then evaporated to remove methyl alcohol and the resulting product was a reddish-purple solid having a melting point of 137.5°, a nitrogen content of 24.93% as compared to a theoretical nitrogen content of 24.56% for this compound.

Some polyamines of the above mentioned type are liquids, others are solids. These amines are, as a rule, insoluble in water, but are soluble in the lower aliphatic alcohols, ether, and benzene.

The polyamines of my invention have been found to be useful, in certain instances, as intermediates for the preparation of surface active agents. They are likewise useful as intermediates in the preparation of numerous other valuable organic compounds such as dyes, intermediates, photographic preparations, anti-skinning agents, antioxidants and the like.

My invention now having been described, what I claim is:

1. Symmetrical 2-amino-2-alkyl-N,N'-phenyl-1,3-propanediamines having the general formula:

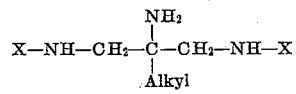

wherein X represents a substituent selected from a group consisting of phenyl, chlorophenyl, aminophenyl and alkylphenyl.

2. 2-amino-2-methyl-N,N'-diphenyl-1,3-propanediamine.

3. 2-amino-2-methyl-N,N'-di-p-tolyl-1,3-propanediamine.

4. 2-amino-2-methyl-N,N'-bis(p-aminophenyl)-1,3-propanediamine.

5. A process for preparing symmetrical 2-amino-2-alkyl-N,N'-1,3-propanediamines of the general formula:

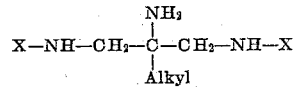

wherein X represents a substituent selected from a group consisting of phenyl, chlorophenyl, aminophenyl and alkylphenyl, which comprises subjecting the corresponding 2-nitro-2-alkyl-N,N'-1,3-propanediamines to catalytic hydrogenation under pressure in the liquid phase.

6. A process for preparing 2-amino-2-methyl-

N,N'-diphenyl-1,3-propanediamine which comprises subjecting 2-nitro-2-methyl-N,N'-diphenyl-1,3-propanediamine to catalytic hydrogenation under pressure in the liquid phase.

7. A process for preparing 2-amino-2-methyl-N,N'-di-p-tolyl-1,3-propanediamine which comprises subjecting 2-nitro-2-methyl-N,N'-di-p-tolyl-1,3-propanediamine to catalytic hydrogenation under pressure in the liquid phase.

8. A process for preparing 2-amino-2-methyl-N,N'-bis(p-aminophenyl)-1,3-propanediamine which comprises subjecting 2-nitro-2-methyl-N,N'-bis(p-nitro-phenyl)-1,3-propanediamine to catalytic hydrogenation under pressure in the liquid phase.

HAROLD G. JOHNSON.

REFERENCES CITED

The following references are of record in the file of this patent:

UNITED STATES PATENTS

| Number | Name | Date |
|---|---|---|
| 2,252,099 | Rosen | Aug. 12, 1941 |
| 2,292,212 | Dickey | Aug. 4, 1942 |

OTHER REFERENCES

De Manny, Bul. Soc. Chim. de France (5), 4 (1937), pages 1456 and 1457.